US008727056B2

(12) United States Patent
Nagda

(10) Patent No.: US 8,727,056 B2
(45) Date of Patent: May 20, 2014

(54) SYSTEMS AND METHODS FOR GENERATING AND USING MOVING VIOLATION ALERTS

(75) Inventor: Paresh L. Nagda, Pleasanton, CA (US)

(73) Assignee: Navman Wireless North America Ltd., Glenview, IL (US)

( * ) Notice: Subject to any disclaimer, the term of this patent is extended or adjusted under 35 U.S.C. 154(b) by 168 days.

(21) Appl. No.: 13/078,810

(22) Filed: Apr. 1, 2011

(65) Prior Publication Data

US 2012/0253670 A1 Oct. 4, 2012

(51) Int. Cl.
*B60K 31/18* (2006.01)

(52) U.S. Cl.
USPC .............. 180/171; 180/170; 701/70; 701/93; 701/400; 701/408; 342/357.2

(58) Field of Classification Search
None
See application file for complete search history.

(56) References Cited

U.S. PATENT DOCUMENTS

| 5,724,243 | A | 3/1998 | Westerlage et al. |
| 5,760,742 | A | 6/1998 | Branch et al. |
| 5,928,291 | A | 7/1999 | Jenkins et al. |
| 5,987,381 | A | 11/1999 | Oshizawa |
| 6,182,006 | B1 | 1/2001 | Meek |
| 6,253,129 | B1 | 6/2001 | Jenkins et al. |
| 6,339,745 | B1 * | 1/2002 | Novik ........................... 701/431 |
| 6,351,697 | B1 | 2/2002 | Baker |
| 6,370,475 | B1 * | 4/2002 | Breed et al. .................. 701/301 |
| 6,405,126 | B1 | 6/2002 | Palomo et al. |
| 6,456,207 | B1 | 9/2002 | Yen |
| 6,526,341 | B1 | 2/2003 | Bird et al. |
| 6,556,905 | B1 | 4/2003 | Mittelsteadt et al. |
| 6,611,755 | B1 | 8/2003 | Coffee et al. |
| 6,845,317 | B2 * | 1/2005 | Craine ........................... 701/454 |
| 6,865,457 | B1 | 3/2005 | Mittelsteadt et al. |
| 6,892,131 | B2 | 5/2005 | Coffee et al. |
| 6,965,876 | B2 | 11/2005 | Dabbiere |
| 6,968,272 | B2 | 11/2005 | Knockeart et al. |
| 7,026,985 | B2 | 4/2006 | Subbarao et al. |
| 7,317,975 | B2 | 1/2008 | Woolford et al. |
| 7,356,392 | B2 | 4/2008 | Hubbard et al. |

(Continued)

FOREIGN PATENT DOCUMENTS

| JP | 8221696 | 8/1996 |
| JP | 2002352389 | 12/2002 |
| JP | 2004245630 | 9/2004 |

OTHER PUBLICATIONS

Notification of International Search Report and Written Opinion dated May 16, 2012 for PCT Application No. PCT/US2011/059307, May 16, 2012, 1-12.

(Continued)

*Primary Examiner* — Thomas Tarcza
*Assistant Examiner* — Richard Goldman
(74) *Attorney, Agent, or Firm* — Carr & Ferrell LLP

(57) ABSTRACT

Systems and methods for generating and using moving violation alerts are disclosed. A navigation device located in a vehicle determines the vehicle's present location and present speed, and generates a moving violation alert. The moving violation alert comprises at least one of time information, location information, road segment information, and sensor information. A tracking device coupled to the navigation device provides the moving violation alert on a network. The network connection is configured to transmit the moving violation alert from the navigation device to a recipient outside the vehicle. Moving violation alerts may be stored and analyzed by the recipient.

32 Claims, 5 Drawing Sheets

(56) References Cited

U.S. PATENT DOCUMENTS

| | | | |
|---|---|---|---|
| 7,389,198 B1* | 6/2008 | Dimitriadis | 702/142 |
| 7,437,225 B1 | 10/2008 | Rathinam | |
| 7,489,993 B2* | 2/2009 | Coffee et al. | 701/32.3 |
| 7,558,564 B2 | 7/2009 | Wesby | |
| 7,571,036 B2* | 8/2009 | Olsen et al. | 701/29.3 |
| 7,584,033 B2 | 9/2009 | Mittelsteadt et al. | |
| 7,589,643 B2* | 9/2009 | Dagci et al. | 340/905 |
| 7,660,658 B2* | 2/2010 | Sheynblat | 701/93 |
| 7,783,406 B2* | 8/2010 | Rothschild | 701/93 |
| 7,912,641 B2 | 3/2011 | Osentoski et al. | |
| 7,941,258 B1 | 5/2011 | Mittelsteadt et al. | |
| 8,134,496 B2* | 3/2012 | Mizuochi et al. | 342/357.2 |
| 8,149,137 B2* | 4/2012 | Tanaka | 340/905 |
| 8,275,490 B2* | 9/2012 | Brusilovsky et al. | 701/1 |
| 8,305,206 B2* | 11/2012 | Miller et al. | 340/441 |
| 8,306,739 B2* | 11/2012 | Miller | 701/412 |
| 8,386,145 B2* | 2/2013 | Rothschild | 701/93 |
| 2002/0126023 A1* | 9/2002 | Awada | 340/905 |
| 2002/0156558 A1* | 10/2002 | Hanson et al. | 701/33 |
| 2003/0163233 A1 | 8/2003 | Song et al. | |
| 2004/0027258 A1 | 2/2004 | Pechatnikov et al. | |
| 2004/0143466 A1 | 7/2004 | Smith et al. | |
| 2004/0249545 A1 | 12/2004 | Lu et al. | |
| 2005/0046594 A1 | 3/2005 | Taylor | |
| 2005/0114014 A1 | 5/2005 | Isaac | |
| 2005/0131597 A1 | 6/2005 | Raz et al. | |
| 2005/0171660 A1* | 8/2005 | Woolford et al. | 701/33 |
| 2005/0171663 A1 | 8/2005 | Mittelsteadt et al. | |
| 2005/0264404 A1* | 12/2005 | Franczyk et al. | 340/441 |
| 2006/0047417 A1 | 3/2006 | Tanabe | |
| 2006/0052918 A1* | 3/2006 | McLeod et al. | 701/29 |
| 2006/0111822 A1* | 5/2006 | Simon | 701/29 |
| 2006/0142913 A1 | 6/2006 | Coffee et al. | |
| 2006/0164259 A1* | 7/2006 | Winkler et al. | 340/944 |
| 2007/0067086 A1* | 3/2007 | Rothschild | 701/93 |
| 2007/0135978 A1 | 6/2007 | Kim et al. | |
| 2007/0179709 A1 | 8/2007 | Doyle | |
| 2007/0185627 A1* | 8/2007 | Mavreas | 701/2 |
| 2007/0213887 A1 | 9/2007 | Woodings | |
| 2007/0294033 A1 | 12/2007 | Osentoski et al. | |
| 2008/0262670 A1 | 10/2008 | McClellan et al. | |
| 2008/0287151 A1 | 11/2008 | Fjelstad et al. | |
| 2009/0240427 A1* | 9/2009 | Siereveld et al. | 701/201 |
| 2010/0004853 A1* | 1/2010 | Siereveld et al. | 701/201 |
| 2010/0007523 A1* | 1/2010 | Hatav | 340/901 |
| 2010/0088163 A1 | 4/2010 | Davidson et al. | |
| 2010/0094539 A1 | 4/2010 | Tomizawa | |
| 2010/0198491 A1 | 8/2010 | Mays | |
| 2010/0271196 A1* | 10/2010 | Schmitt et al. | 340/466 |
| 2010/0299021 A1* | 11/2010 | Jalili | 701/35 |
| 2010/0312419 A1 | 12/2010 | Woodings | |
| 2010/0332069 A1 | 12/2010 | Tippy | |
| 2011/0077028 A1* | 3/2011 | Wilkes et al. | 455/456.3 |
| 2011/0148658 A1 | 6/2011 | Murray et al. | |
| 2011/0161138 A1 | 6/2011 | Keaveny et al. | |
| 2012/0182159 A1* | 7/2012 | Alipour | 340/928 |
| 2012/0243686 A1 | 9/2012 | Wesby | |
| 2012/0253888 A1 | 10/2012 | Davidson | |
| 2012/0253889 A1 | 10/2012 | Davidson et al. | |

OTHER PUBLICATIONS

International Search Report and Written Opinion, International Application No. PCT/US2012/053648, dated Feb. 27, 2013.

International Preliminary Report on Patentability, International Appliction No. PCT/NZ2006/000043, Feb. 5, 2007.

International Search Report, International Appliction No. PCT/NZ2006/000043, issued on Jun. 27, 2006.

International Search Report, International Appliction No. PCT/EP2002/014778, issued on Dec. 15, 2003.

European Search Report, European Patent Application No. 06733138.9 filed Mar. 9, 2006, mailed Jul. 4, 2011.

International Search Report and Written Opinion, International Application No. PCT/US2011/059278, dated May 4, 2012.

International Search Report and Written Opinion, International Application No. PCT/US2013/028757, dated Sep. 30, 2013.

* cited by examiner

SYSTEMS AND METHODS FOR GENERATING AND USING MOVING VIOLATION ALERTS

TECHNICAL FIELD

This invention relates generally to driver improvement, and more specifically, to managing excessive vehicle speed information.

BACKGROUND OF THE INVENTION

The global positioning system (GPS) is a space-based navigation system including a network of orbiting satellites (called NAVSTAR). Although established for military applications by the U.S. Department of Defense, in the 1980s the system was made available for civilian use. When locked onto the signal of at least three satellites, a GPS receiver may calculate a 2D position (latitude and longitude). When locked onto the signal of at least four satellites, a GPS receiver may calculate a 3D position (latitude, longitude and altitude), subject to the accuracy of map information in the receiver and accuracy of the location calculation. The GPS also provides highly accurate timestamps.

When used in a vehicle and once a GPS navigation system has determined its location using signals from the orbiting satellites, the GPS navigation system may display a map and instruct a driver by providing graphical information, as well as via text or speech on how to get to a destination. GPS navigation systems may be used to navigate in unfamiliar areas with reduced risk of getting lost, subject to the accuracy of the location information and maps used by the GPS navigation system. When a driver becomes lost, valuable time is lost and the driver could become late for a delivery, appointment, or arrival at a work site.

Different businesses, such as shipping and distribution companies, cargo systems companies, maintenance, repair and operations (MRO) organizations, service vehicle operators, cable television operators, schools, construction companies, and the like operate a fleet of mobile assets. Organizations employing mobile assets have an interest in ensuring their drivers operate the mobile asset in a safe manner. One indicator of safe vehicle operation is whether or not a driver commits a moving violation, such as speeding, running a stop sign, failure to signal for turns or lane changes, crossing over a median, driving on the shoulder, failure to use a seatbelt, and the like. In general, moving violations may be defined and enforced by national and/or municipal governments and their associated law enforcement agencies.

A commonly enforced moving violation is speeding. Speeding can be exceeding a posted speed limit or driving at an unsafe speed. In many countries, the speed of motor vehicles is regulated with speed limits. Speed limits are typically indicated with a traffic sign, and speed limits may specify a maximum speed, minimum speed, or no speed. Speed limits take into consideration the type and location of a road, which may require slower driving speeds out of safety concerns (e.g., treacherous road conditions and in areas where pedestrians or school children are likely to enter the roadway without warning).

DETAILED DESCRIPTION OF THE INVENTION

In the following description, certain details are set forth below to provide a sufficient understanding of the invention. However, it will be clear to one skilled in the art that the invention may be practiced without these particular details. In other instances, well-known circuits, control signals, timing protocols, and software operations have not been shown in detail or omitted entirely in order to avoid unnecessarily obscuring the invention.

Figure 1:
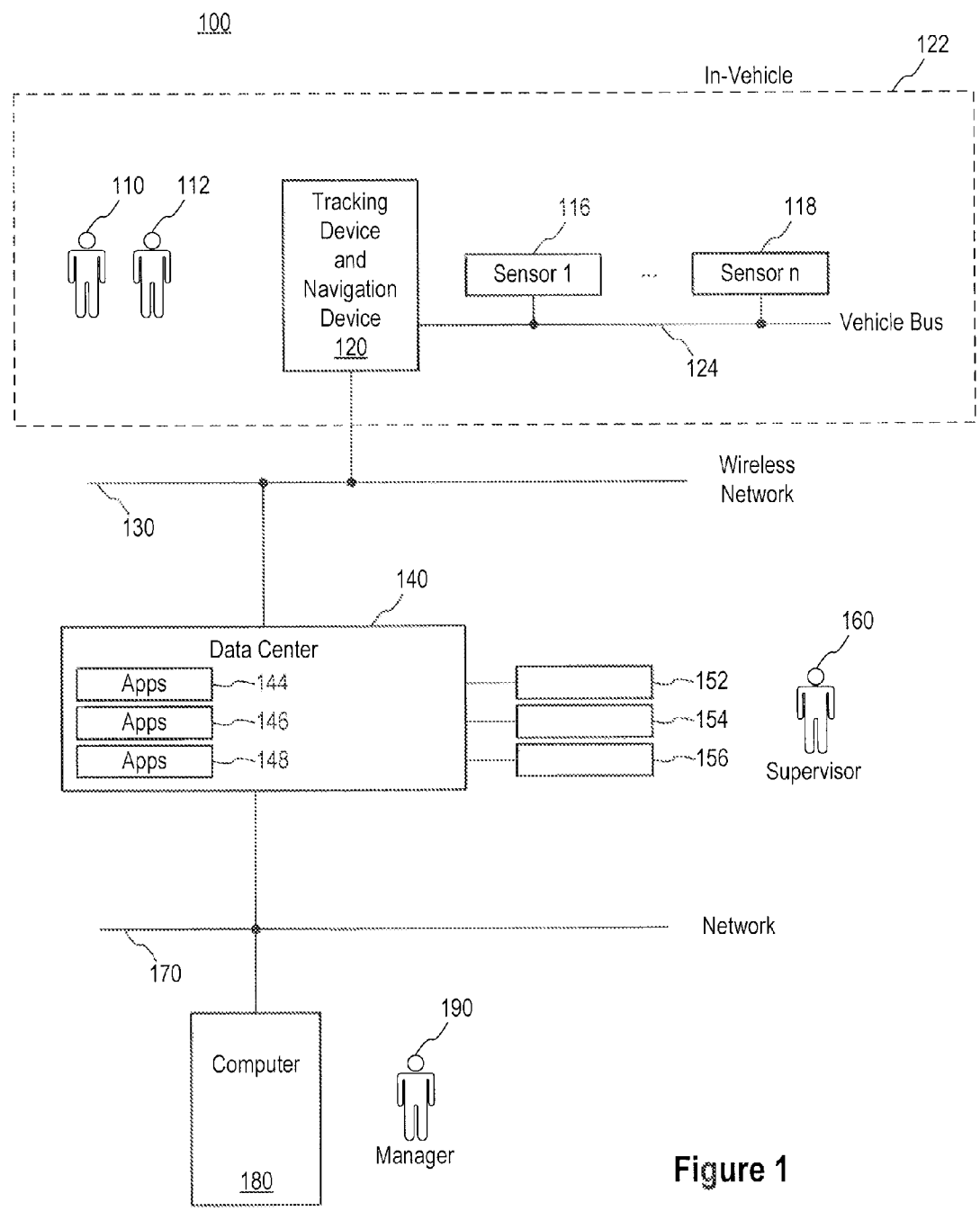
FIG. 1 is a block diagram of a system for generating and analyzing moving violation alerts according to an embodiment of the present invention.

FIG. 1 illustrates a system for generating and using moving violation alerts according to an embodiment of the present invention. Moving violations, for example, are set up, configured, or programmed within the system, whether proscribed by law or against an organization's safe driving policy. In some embodiments, a moving violation may be exceeding a posted speed limit, driving while not wearing a seatbelt, driving with a door open, driving outside a geographic region defined by a geo-fence, driving outside of a prescribed route, and accelerating or decelerating the vehicle too quickly.

Vehicle 122 is operated by driver 110 and optionally co-driver 112. Vehicle 122 may be a motor vehicle (e.g., delivery truck, field service vehicle, school bus, company car, etc.), heavy equipment (e.g., garbage truck, cherry picker, street sweeper, tractor, etc.), and the like. Driver 110 and/or co-driver 112 interface with tracking device and navigation device 120. Sensors 116-118 are arrayed within vehicle 122 for monitoring and optionally controlling systems. For example, sensors 116-118 may monitor whether a driver 110 and co-driver 112 have their seat belts on, whether a vehicle door is open, cargo temperature in a truck or van, fuel level, acceleration, deceleration, hours on the road, vehicle ignition, door locked/unlocked state, airbag deployment, impact/vehicle collision, vehicle speed and direction, and the like. Sensors 116-118 may be used with control circuitry and actuators (not shown) to control vehicle ignition (e.g., start or turn off engine), adjust temperature in a truck or van, adjust vehicle speed (e.g., slow down), unlock doors, and the like. Vehicle bus 124 connects sensors 116-118 to tracking device and navigation device 120. Vehicle bus 124 may be a wireless or wired bus for communicating data, commands, and optionally provide power (e.g., Controller Area Network (CAN) bus, On-Board Diagnostics (OBD-II), J-Bus, power bus, RS-232, RS-422, RS-484, universal serial bus (USB), 1-Wire, custom bus, etc.).

In some embodiments of the present invention, the speed of the vehicle may be determined by tracking device and navigation device 120. Vehicle speed may be determined using a wheel tick method which employs one or more sensors 116-118 positioned in wheels of vehicle 122. Such sensors may record the number of wheel rotations in a predetermined amount of time (e.g., 10 seconds) and calculate vehicle speed based in part on the wheel's circumference, number of rotations, and amount of time. Vehicles may include a speedometer, a type of sensor, which reports vehicle speed to driver 110 via a dashboard gauge or display. The speedometer may be coupled to vehicle bus 124 and communicate vehicle speed to tracking device and navigation device 120.

Tracking device and navigation device 120 may determine the geographic location of the vehicle, for example using a Global Positioning System (GPS) receiver within tracking device and navigation device 120. In some embodiments, tracking device and navigation device 120 may provide a moving violation alert to the driver 110 and/or co-driver 112 on a display when the vehicle's speed exceeds safe limits (e.g., the posted speed limit). As will be described in more detail below, tracking device and navigation device 120 may also generate a moving violation alert which is sent to data center 140. Information from the tracking device and navigation device 120 may be transmitted over a wireless network 130 to data center 140. As will be described in more detail below, in some embodiments the tracking device and navigation device 120 and the data center 140 may communicate using messages, for example, a moving violation alert generated by tracking device and navigation device 120.

Wireless network 130 may be a local-area network (e.g., Wi-Fi (IEEE 802.11)), and/or wide-area network (e.g., "3G" (i.e., International Mobile Telecommunications-2000 (IMT-2000) (e.g., 3GPP Long Term Evolution (LTE), High-Speed Downlink Packet Access (HSDPA), High-Speed Uplink Packet Access (HSUPA), etc.)), "4G" (e.g., LTE Advanced and WirelessMAN-Advanced), WiMAX (IEEE 802.16m), CDMA2000 (e.g., 1X, 1xRTT, EV-DO Rev. 0, EV-DO Rev. A, and EV-DO Rev. B), global system for mobile communications (GSM) (e.g., general packet radio service (GPRS), and enhanced data rates for GSM evolution (EDGE) or Enhanced GPRS (EGPRS)), integrated digital enhanced network (iDEN), wideband integrated digital enhanced Network (WiDEN), advanced mobile phone system (AMPS), total access communication system (TACS), Extended Total Access Communication System (ETACS), Universal Mobile Telecommunications System (UMTS), and the like).

The data center 140 may be connected to receive and/or transfer information over wireless network 130, store information, run applications 144-148 and provide information to applications 152-156. The applications 152-156 may be "external" to the data center 140 and represent third-party applications utilized by supervisor 160 to improve driver safety. Data center 140 may also be connected to and transfer data over network 170. Network 170 may be a wired (e.g., twisted pair, coaxial cable, optical fiber, etc.) and/or wireless (e.g., terrestrial microwave, communications satellites, cellular and PCS systems, wireless LANs, and/or infrared communications) computer network (e.g., the Internet).

Applications 144-148 and 152-156 may store the moving violation alert information provided to the data center 140 by the tracking device and navigation device 120. As will be described in more detail below, applications 144-148 and 152-156 may analyze moving violation alert information and produce output in various forms and formats for use by supervisor 160 and manager 190.

Computer 180 may be a workstation, computer, notebook computer, netbook computer, tablet computer, smart phone, PDA, and the like. Computer 180 may include one or more processors, input/output (I/O) devices, and storage. For example, processors can be an x86, SPARC, PowerPC, ARM, and the like architecture. I/O devices may include a keyboard, mouse, trackball, touchpad, microphone, touch screen, flat panel, electronic ink display, indicator lights, speaker, and the like. Storage, for example, may store firmware, operating system, etc. The firmware and/or operating system may be programmed and tested like software, may be implemented to coordinate operations of the hardware within computer 180, and may contain programming constructs used to perform such operations. Storage may be volatile memory (e.g., RAM, SRAM, etc.), non-volatile memory (e.g., FLASH, EEPROM, etc.), magnetic media (e.g., hard disk drive), and/or removable media (e.g., compact disc (CD), digital versatile disc (DVD), Blu-ray disc (BD), USB, flash drive, secure digital (SD) memory card, secure digital high capacity (SDHC) memory card, etc.).

Figure 2:
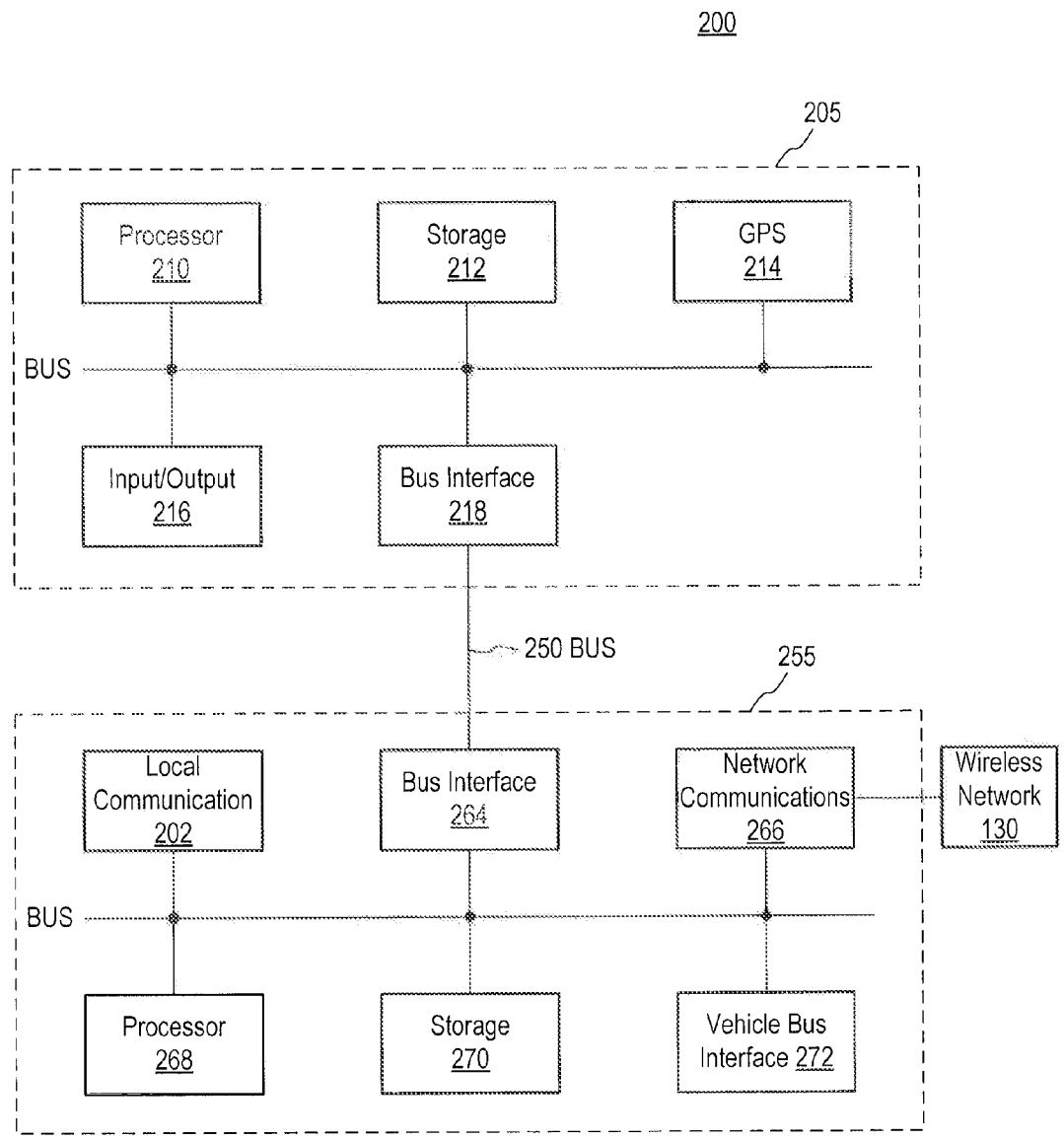
FIG. 2 is a block diagram of a tracking and navigation device according to an embodiment of the present invention.

FIG. 2 illustrates a tracking device and navigation device 200 according to an embodiment of the present invention. Tracking device and navigation device 200 may include a navigation device (ND) 205 and tracking device (TD) 255. ND 205 and TD 255 are in communication with one another over a bus 250. ND 205 may include one or more processors 210. Processors 210, for example, may perform functions such as generating moving violation alerts a described below.

In some embodiments, inputs from vehicle sensors, for example, sensors 116-118, provided by TD 255 may also be used by ND 205 to generate moving violation alerts. Sending real-time moving violation alerts generated by ND 205 through TD 255 to data center 140 enables applications 144-148 and 152-156 to store and analyze the alerts as described below. Processors 210, for example, may perform such functions as determining a route or routes to a destination and determining present vehicle speed. Processors 210 may be microprocessors (e.g., x86, ARM, PowerPC, etc.), application specific standard products (e.g., GPS processor), application specific integrated circuits, programmable logic (e.g. field programmable gate arrays (FPGAs)), and the like.

Storage 212, for example, may store a map database, configuration information, firmware, operating system, etc. The map database may include identifiers (e.g., name and class) and speed limits for road segments. Road classes may, for example, be associated with road types such as highway, freeway, city street, arterials, near a school, private roads, etc. The speed limits for road segments may be used to determine whether moving violations occur. When speed limits for road segments are not available, a road speed may be determined based at least in part from other road attributes, for example, class of road, location, etc. of the road segment. In some embodiments, the road speed for a road segment may be programmed. The firmware and/or operating system may be programmed and tested like software, may be implemented to coordinate operations of the hardware within ND 205 (and tracking device and navigation device 200), and may contain programming constructs used to perform such operations. Storage 212 may be volatile memory (e.g., RAM, SRAM, etc.), non-volatile memory (e.g., FLASH, EEPROM, etc.), magnetic media (e.g., hard disk drive), and/or removable media (e.g., CD, DVD, BD, USB flash drive, SD memory card, SDHC memory card, etc.). Global Positioning System (GPS) receiver 214 is configured to receive GPS signals for the purpose of determining the device's current location (on Earth).

ND 205 may also include input/output (I/O) 216 to receive information from and provide information to a user. I/O 216 may include a keyboard, mouse, trackball, touchpad, microphone, touch screen, flat panel, electronic ink display, indicator lights, speaker, and the like. A bus interface 218 enables ND 205 to communicate over bus 250, for example, bus 250 may transfer data (e.g., estimated time of arrival (ETA) value) between ND 205 and TD 255. The bus 250 may be wired (e.g., industry standard architecture (ISA), peripheral component interconnect (PCI), RS-232, RS-422, RS-485, Ethernet (IEEE 802.3), custom wired, etc.) and/or wireless (e.g., Wi-Fi (IEEE 802.11), Bluetooth, ZigBee, wireless personal area network (WPAN), etc.).

TD 255 may include one or more processors 268 and storage 270. Processors 268, for example, may perform such functions as local processing of ETA information from ND 205, location calculations, process location events, messaging (i.e., receiving, dissembling, assembling, and transmitting messages), and the like. Processors 268 may be microprocessors (e.g., x86, ARM, PowerPC, etc.), application specific standard products, application specific integrated circuits, programmable logic (e.g., field programmable gate arrays (FPGAs)), and the like. Storage 270, for example, may store firmware, operating system, etc. The firmware and/or operating system may be programmed and tested like software, may be implemented to coordinate operations of the hardware within TD 255 (and tracking device and navigation device 200), and may contain programming constructs used to perform such operations. Storage 270 may be volatile memory (e.g., RAM, SRAM, etc.), non-volatile memory (e.g., FLASH, EEPROM, etc.), magnetic media (e.g., hard disk drive), and/or removable media (e.g., CD, DVD, BD, USB flash drive, SD memory card, SDHC memory card, etc.).

TD 255 may also include local communications interface 202, bus interface 264, and network communications interface 266. Bus interface 264 enables TD 255 to communicate over bus 250. Vehicle bus interface 272 enables TD 255 to communicate over vehicle bus 124 shown in FIG. 1. Network communications interface enables TD 255 to communicate (e.g., messages) over wireless network 130 shown in FIG. 1.

Figure 3:
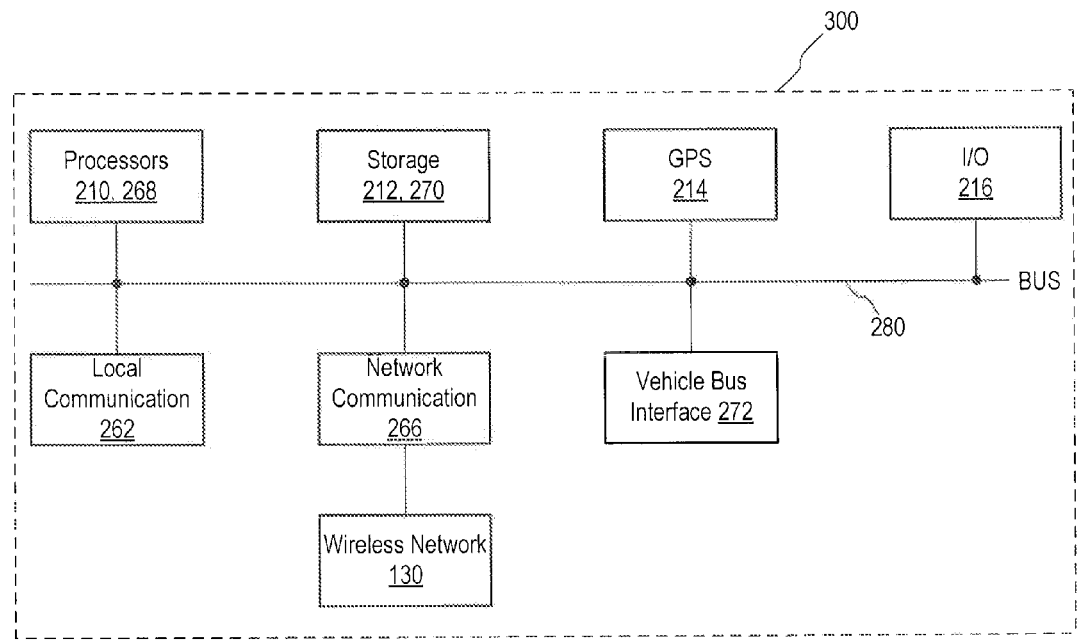
FIG. 3 is a block diagram of a tracking and navigation device according to another embodiment of the present invention.

FIG. 3 illustrates a tracking device and navigation device 300 according to another embodiment of the present invention. Tracking and navigation device (TND) 300 integrates ND 205 and TD 255 of FIG. 2 into a common assembly, which may eliminate redundant components, resulting in cost savings and higher reliability. In contrast to tracking device and navigation device 200 of FIG. 2, several components of ND 205 and TD 255 are shared and other components are not included in TND 300. For example, busses 230, 250, and 278 are not included in TND 300 nor are bus interfaces 218, 250, and 264, because the various components communicate over bus 280. In some embodiments, the functions of processors 210, 268 previously described for ND 205 and TD 255 are performed by a single processor. TND 300 may be in one assembly housed within one shielded enclosure. Hence, TND 300 may be more reliable and operate faster than tracking device and navigation device 200 shown in FIG. 2, because communication between ND 205 and TD 255 over bus 250 shown in FIG. 2 must be engineered to withstand a harsh and noisy automotive environment.

Referring to FIGS. 2 and 3, TD 255 and TND 300 (respectively) may send data over wireless network 130 to data center 140 in a message. For example information may be exchanged in messages between TD 255 or TND 300 and data center 140. In some embodiments messages may contain a moving violation alert or configuration information for generating moving violation alerts. As previously discussed, the information provided to the data center 140 by the TD 255 or TND 300 may be used by applications 144-148 and 152-156 to assist in driver improvement and accountability. TD 255 and TND 300 may send moving violation alerts on a regular basis or in response to a request from data center 140. In some embodiments, data center 140 may send a request for alerts stored in TD 255 and/or TND 300. In response to the request for alerts, TD 255 and TND 300 may send alerts they have stored.

Figure 4:
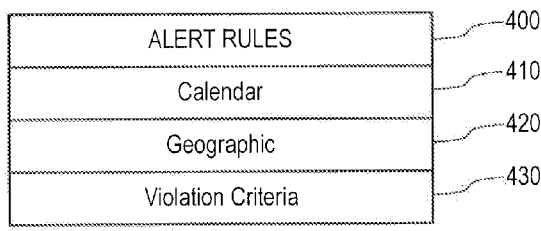
FIG. 4 is a table illustrating moving violation alert parameters according to embodiments of the present invention.

FIG. 4 illustrates parameters (or rules) 400 for generating moving violation alerts. For example, alert parameters may include calendar parameters 410, geographic parameters 420, and violation criteria 430. Calendar parameters 410 may define times when tracking device and navigation device 120, 200, and 300 may generate and transmit moving violation alerts. For example, moving violation alerts may be generated at all times the vehicle is in operation, until a certain date and time (e.g., until a leased vehicle is returned or a contract expires), between certain starting and ending dates and times, according to a weekly schedule, when the vehicle is in service or on duty (e.g., a non-cyclical, configurable schedule), and the like.

Geographic parameters 420 may define places when tracking device and navigation device 120, 200, and 300 may generate and transmit moving violation alerts. For example, moving violation alerts may be generated on all roads, roads of a certain class, inside or outside certain geographic regions (e.g., geo-fence), and specific roads. A geo-fence is a closed polygon encompassing and defining a geographic area. Geofences may correspond to certain regions such as a city, county, state, ZIP code, or custom region.

Violation criteria 430 may define what constitutes a moving violation. A moving violation, for example, may be exceeding a posted speed limit by a configurable amount (e.g., in miles per hour (MPH)) and/or by a certain percentage (e.g., a percentage above the posted speed limit). Violations may be based upon time (e.g., vehicle speed exceeds a certain speed for a given time interval, such as driving three MPH above a road's posted speed limit for more than two continuous minutes), distance of travel (e.g., vehicle speed exceeds a certain speed for a given distance, such as driving three MPH above a road's posted speed limit for at least one-half mile), driver behavior (e.g., always generating reports for chronic/habitual speeders), and absolute speed (e.g., vehicle speed cannot exceed a certain speed at any time, such as thirty-five MPH).

ND 205 and TND 300 may monitor current time, speed, and location to determine whether a moving violation event has occurred and generate a moving violation alert. In some embodiments a moving violation alert may be a violation start alert and/or a violation end alert. A violation start alert may be generated when a condition (or conditions) which satisfies a rule (or rules) for generating moving violation alerts begins. A violation end alert may be generated when a condition (or conditions) which meets a parameter (or parameters) for generating moving violation alerts ends. For example, in some embodiments when a violation criteria for vehicle speed is set to 10%, a vehicle traveling on a road with a 50 MPH speed limit would exceed a speed of 55 MPH before a violation start alert is generated and would fall below a speed of 55 MPH before a violation end alert is generated. ND 205 and TND 300 may check if a moving violation event has occurred at intervals less than one second in time and/or a hundred meters in distance. In some embodiments, ND 205 and TND 300 may check if a moving violation event has occurred every 500 milliseconds and/or ten meters.

Figure 5:
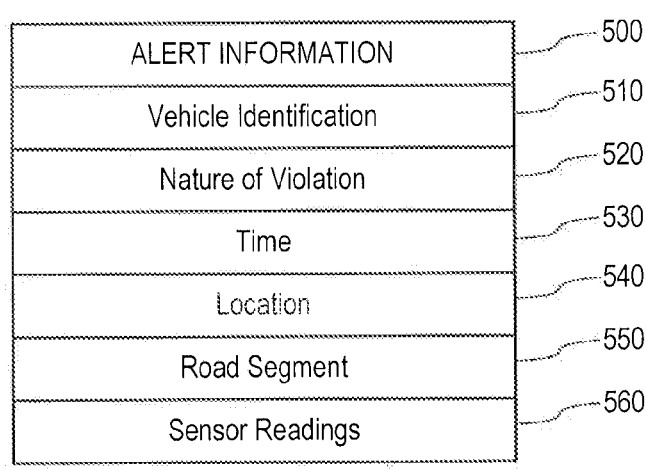
FIG. 5 is a table illustrating moving violation alert information according to embodiments of the present invention.

FIG. 5 illustrates moving violation alert information 500. Alert information 500 may include information about vehicle 510, nature of violation 520, time 530, location 540, road segment 550, and sensor readings 560 at the time of the moving violation event (or occurrence). For example, vehicle identification 510 may identify the vehicle and indicate the source of the alert. Nature of violation 520 may indicate the type of violation and include pertinent data (e.g., an end violation alert may include the peak speed reached when a vehicle exceeded a posted speed limit of 65 miles per hour by traveling at 100 miles per hour for more than two minutes).

Time information 530 may be the timing of a moving violation event (e.g., start date and time, end date and time, duration of event, etc.).

Location information 540 may be where the moving violation event occurred (e.g., starting location identifier, ending location identifier, distance over which event occurred, identifier of geo-fence where event occurred, etc.). Location identifiers may, for example, be an address, latitude and longitude, and the like determined by the GPS 214.

Road segment information 550 may include information about the road segment where the moving violation event occurred (e.g., road segment identifier, name, class, etc.), posted speed limit, vehicle speed (e.g., actual, maximum, average, etc. speeds), and the like.

Sensor readings 560 may include information from vehicle sensors before, during, and after a moving violation event. For example, information from vehicle sensors may include seat belt state (e.g., fastened or unfastened), door state (e.g., open or closed), airbags (e.g., deployed or undeployed), snow plow state (e.g., plow up or down), street sweeper state (e.g., arm up or down), temperature, proximity to other vehicles, lane change state (e.g., changing lanes or not changing lanes), and the like.

As noted earlier, applications 144-148 may store moving violation alert information. Applications 144-148 and 152-156 may analyze moving violation alert information and produce output in various forms and formats. For example, a report may include a history of all violations for a specific vehicle and/or driver. A report may summarize multiple moving violation alerts, including the number, frequency, and areas of moving violation events. A report may be in the form of a map showing roads on which moving violations have occurred or roads where a specific violation has occurred. In addition, applications 144-148 and 152-156 may notify a supervisor 160 or manager 190 in real time of a moving violation alert by display on a computer screen (e.g., pop up window, moving icon, etc.), email message, SMS message, (automated) telephone call, and the like. In this way, supervisor 160 and manager 190 have tools to improve the safety of driver 110 and co-driver 112.

Figure 6:
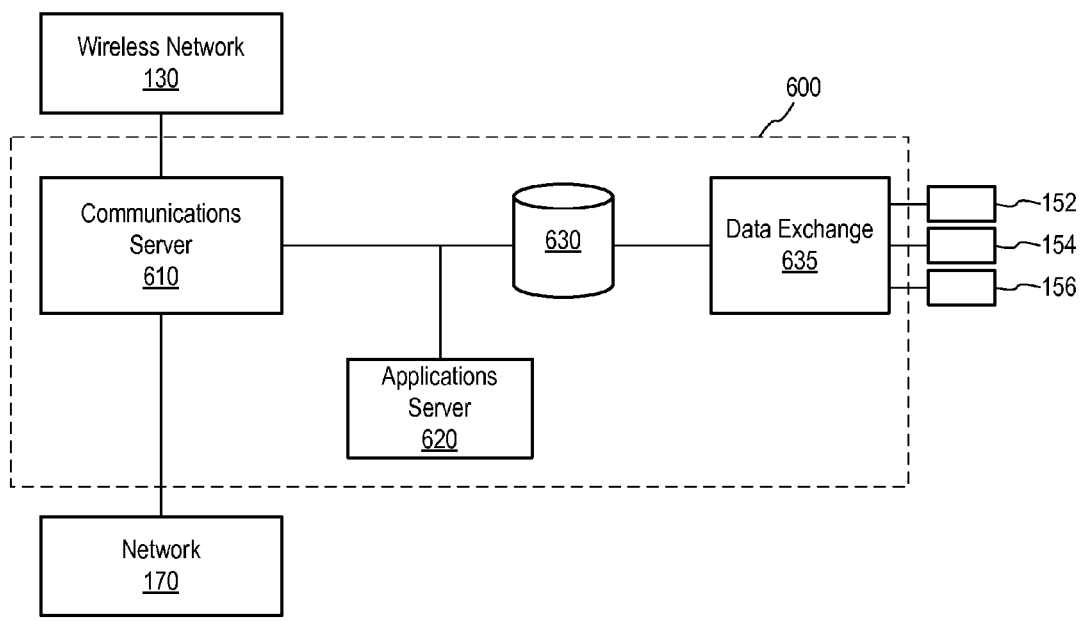
FIG. 6 is a block diagram of a data center according to an embodiment of the present invention.
Figure 3:
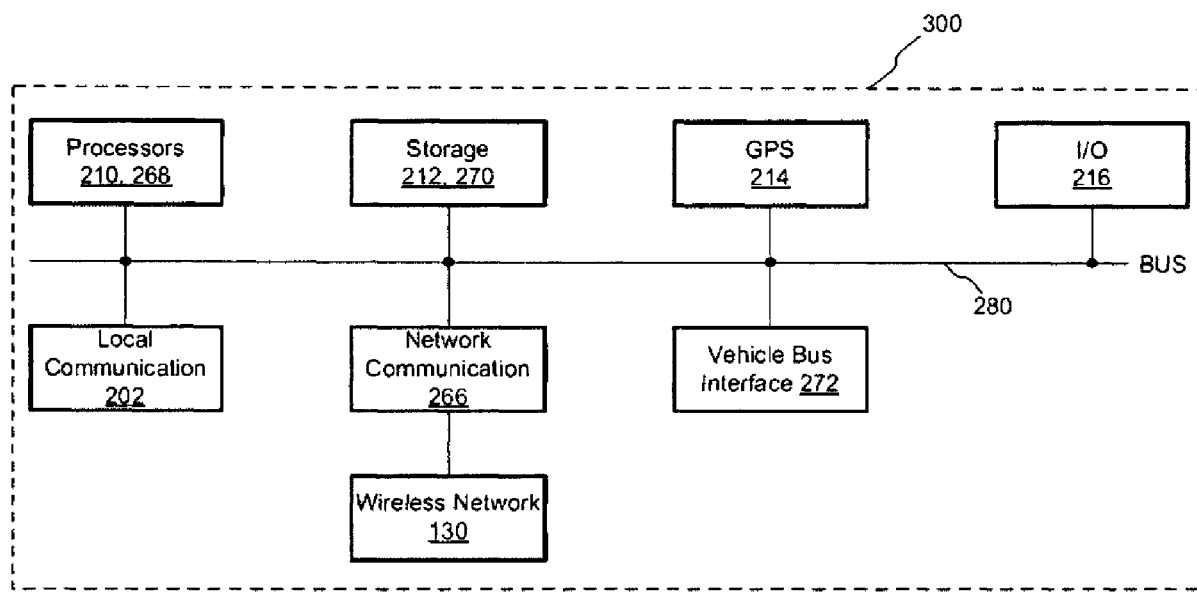
Figure 4:
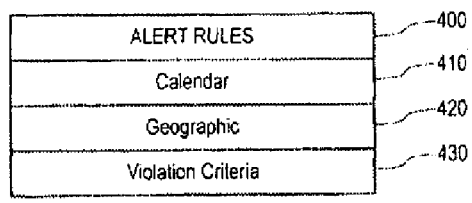

FIG. 6 illustrates a data center 600 according to an embodiment of the present invention. Data center 600 may include a communications server 610, storage 630, applications server 620, and data exchange 635. As readily understood by one of ordinary skill in the art, communications server 610 may include processors, memory, storage (including removable media), I/O, communications interfaces, etc. Communications server 610 may be a computer system designed to handle a wide array of communications-based applications. Storage 630 may be a database which stores information, for example, ETA information.

Application server 620 may be a computer system designed to run software applications 144-148. Application server 620, for example, may run applications which store moving violation alert information in storage 630, analyze moving violation alert information, and produce output in various forms and formats. Application server 620 may include processors, memory, storage (including removable media), I/O, communications interfaces, etc. AVL applications, for example, may display any moving violation alerts for each vehicle 122, driver 110, co-driver 112 and other assets on a map; generate a moving violation report representing the data in a tabular or graphical manner and/or as a part of a larger report of vehicle activity; generate an alarm or event indication when a vehicle, driver, or other asset triggers a moving violation alert; and generate a report analyzing driver safety and behavior based in part upon moving violation alert information. Moving violations, for example, may be exceeding a posted speed limit.

Data exchange 635 may take data structured under a source schema and transform it into data structured under a target schema, for example, for use by applications 152-156. Data center 600 is connected to network 170 through communications server 610. As one of ordinary skill in the art would appreciate, different combinations of the above elements are possible. For example, there may be more than one each of the communications server, applications server, storage, and data exchange.

From the foregoing it will be appreciated that, although specific embodiments of the invention have been described herein for purposes of illustration, various modifications may be made without deviating from the spirit and scope of the invention. Such modifications are well within the skill of those ordinarily skilled in the art. Accordingly, the invention is not limited except as by the appended claims.

The invention claimed is:

1. An apparatus for providing a moving violation alert comprising:
   a navigation device configured to be located in a vehicle, the navigation device including a Global Positioning System (GPS) navigation system configured to determine a vehicle's present location and a vehicle's present speed, and further including a first processor configured to generate a moving violation alert based at least in part on the vehicle's present location and vehicle's present speed, the moving violation alert being generated in response to at least one of: the vehicle's present speed exceeding a percentage of a posted speed limit specified by a user and the vehicle's present speed exceeding the posted speed limit for a distance of travel specified by the user;
   a tracking device coupled to the navigation device and including a second processor, the tracking device configured to provide the moving violation alert from the navigation device on a network; and
   a network connection coupled to the tracking device, the network connection configured to transmit the moving violation alert to a recipient outside of the vehicle.

2. The apparatus of claim 1, wherein the posted speed limit is determined from a map database.

3. The apparatus of claim 1, wherein the tracking device is coupled to a sensor.

4. The apparatus of claim 1, wherein the navigation device and the tracking device are in communication through a bus.

5. The apparatus of claim 1, wherein the navigation device and the tracking device comprise a single device.

6. The apparatus of claim 5, wherein the first processor and the second processor comprise a single processor.

7. The apparatus of claim 1, further comprising:
   a data center in communication with the tracking device through the network connection, the data center configured to receive the moving violation alert.

8. The apparatus of claim 7, wherein the data center further comprises:
   a database configured to store the moving violation alert; and
   a data exchange coupled to the database, the data exchange configured to transform the moving violation alert for use by external applications.

9. The apparatus of claim 8, wherein an external application is configured to notify a third party after the data center receives the moving violation alert.

10. The apparatus of claim 9, wherein the third party is notified with at least one of a display on a computer screen, telephone call, an email, or an SMS message.

11. The apparatus of claim 10, wherein the display on a computer screen is at least one of a pop-up window and a moving icon.

12. The apparatus of claim 7, wherein the data center further comprises:
a database which stores the moving violation alert; and
an application server coupled to the database, the application server configured to run internal applications.

13. A method for generating a moving violation alert comprising:
receiving a present vehicle speed and a present vehicle location from a GPS navigation system;
generating the moving violation alert based in part upon the present vehicle speed and the present vehicle location in comparison to map information including at least posted speed limit information for a road segment or road attribute information, the moving violation alert being generated in response to at least one of: the vehicle's present speed exceeding a percentage of a posted speed limit specified by a user and the vehicle's present speed exceeding the posted speed limit for a distance of travel specified by the user; and
transmitting the moving violation over a wireless communication network to a dispatch system.

14. The method of claim 13 wherein the present vehicle speed is determined in part using a sensor which measures wheel rotations.

15. The method of claim 13 wherein the present vehicle speed is further received from a speedometer.

16. The method of claim 13 wherein the moving violation alert is generated further based on when the present vehicle speed is greater than a speed limit for the present vehicle location.

17. The method of claim 16 wherein the speed limit is determined using a map database.

18. The method of claim 13 wherein the moving violation alert is generated further based on at least one of a present date and a present time.

19. The method of claim 16 wherein the moving violation alert is further generated based in part on a schedule.

20. The method of claim 13 wherein the moving violation alert is further generated based in part on a class of road of the present vehicle location.

21. The method of claim 13 wherein the moving violation alert is further generated based in part on whether the present vehicle location is within a predefined area.

22. The method of claim 13 wherein
the moving violation alert comprises at least one of time information, location information, road segment information, and sensor information,
the time information including at least one of a start date and time, an end date and time, and a duration,
the location information including at least one of a starting location identifier, an ending location identifier, a distance, and an identifier of a predefined region,
the road segment information including at least one of a road segment identification, a road name, and a road class, and
the sensor information including at least one of a current vehicle speed, a seat belt state, a door state, and an airbag state.

23. The method of claim 13 further comprising:
providing the moving violation alert over a network to a data center in communication with a tracking device located in the vehicle.

24. The method of claim 23 wherein the moving violation alert is provided to the data center over a wireless network.

25. A non-transitory computer-readable medium having stored thereon instructions that, when executed, direct a processor to:
receive a present vehicle speed and a present vehicle location from a GPS navigation system;
generate a moving violation alert based in part on the present vehicle speed and the present vehicle location, the moving violation alert being generated in response to at least one of: the vehicle's present speed exceeding a percentage of a posted speed limit specified by a user and the vehicle's present speed exceeding the posted speed limit for a distance of travel specified by the user; and
transmit the moving violation alert over a network to a data center in communication with a tracking device located in the vehicle.

26. The non-transitory computer readable medium of claim 25, further having stored thereon instructions that, when executed, direct a processor to:
receive parameters over a network from the data center which in part determine when the moving violation alert is generated.

27. A method for generating moving violation alerts comprising:
receiving a present vehicle speed and receiving a present vehicle location from a GPS navigation system;
generating the moving violation alerts based in part upon the present vehicle speed in comparison to map information including at least one of a posted speed limit information for a road segment, the moving violation alerts including a start moving violation alert in response to at least one condition being satisfied and an end moving violation alert in response to the at least one condition not being satisfied; and
transmitting the moving violation alerts over a wireless communication network to a dispatch system.

28. The method of claim 27 wherein the at least one condition includes one or more of the vehicle's present speed exceeding a posted speed limit for the vehicle's present location by an amount specified by a user and the vehicle's present speed exceeding a posted speed limit for the vehicle's present location by a percentage of the posted speed limit specified by the user.

29. The method of claim 27 wherein the at least one condition includes one or more of the vehicle's present speed exceeding the posted speed limit for a period of time specified by the user and the vehicle's present speed exceeding a posted speed limit for the vehicle's present location by a distance of travel specified by the user.

30. The method of claim 27 wherein the present vehicle speed is determined in part using a sensor which measures wheel rotations.

31. The method of claim 27 wherein the present vehicle speed is further received from a speedometer.

32. The method of claim 27 wherein the speed limit is determined using a map database.

* * * * *

UNITED STATES PATENT AND TRADEMARK OFFICE
CERTIFICATE OF CORRECTION

Page 1 of 2

PATENT NO. : 8,727,056 B2
APPLICATION NO. : 13/078810
DATED : May 20, 2014
INVENTOR(S) : Paresh L. Nagda It is certified that error appears in the above-identified patent and that said Letters Patent is hereby corrected as shown below:

In the Drawings

Delete Drawing Sheet 3 of 5 and substitute therefore with the attached Drawing Sheet 3 of 5.
FIG. 3 has been corrected to change the reference number from "262" to "202".

Signed and Sealed this
Twentieth Day of January, 2015

Michelle K. Lee
*Deputy Director of the United States Patent and Trademark Office*